United States Patent Office 3,243,309
Patented Mar. 29, 1966

3,243,309
COATING PREPARATIONS CONTAINING A COBALT-LEAD-IRON DRIER COMBINATION
Gordon Phillips, Cheam, Surrey, England, and Philip James Fry, Barry Glamorgan, Wales, assignors to The Distillers Company Limited, Edinburgh, Scotland, a British company
No Drawing. Filed Mar. 26, 1963, Ser. No. 267,966
Claims priority, application Great Britain, Mar. 29, 1962, 12,009/62; Dec. 6, 1962, 46,172/62
2 Claims. (Cl. 106—264)

The present invention relates to improved water-dilutable aqueous surface coating compositions.

By water-dilutable is meant that a composition can be diluted with water to produce aqueous paints or primers which can be applied directly to a surface to be protected.

The manufacture of aqueous solutions of surface coating preparations by heating certain drying oils and the like, with an acyclic, olefinic acid or anhydride such as maleic anhydride and dissolving the product in an aqueous solution of a base is known. For example see U.S. patent specification 2,414,712, British patent specification 500,349 and French Patent 1,258,000. In general terms this process for the production of surface coating compositions can be described as reacting a compound functioning as an unsaturated oil with a compound having an available acyclic, olefinic carboxylic acid residue, both compounds as herein defined and then dissolving the resultant reaction product in an aqueous solution of a base.

Another production of an aqueous surface coating composition comprises reacting a compound functioning as an unsaturated oil with a compound having an available acyclic, olefinic carboxylic acid residue, both compounds as herein defined, to produce a water soluble oil/acid product, reacting the oil/acid product with formaldehyde and then dissolving the resultant product in an aqueous solution of a base.

By a compound functioning as an unsaturated oil is meant throughout this specification the oil itself which consists of or comprises a triglyceride ester of an unsaturated fatty acid having at least 12 carbon atoms in the carbon chain containing the unsaturation, or a derivative of such an unsaturated oil which acts as the oil itself. Examples of unsaturated oils are tung, oiticica, linseed, soya, cotton seed, dehydrated castor, perilla, tall and unsaturated fish oils. Examples of suitable derivatives of unsaturated oils are the fatty acids obtained from the oils and esters of such acids e.g. the methyl or polyglycol esters.

By a compound having an available acyclic, olefinic carboxylic acid residue is meant throughout this specification the acids themselves and their simple derivatives including, in the case of polycarboxylic acids their anhydrides. The acids are defined as carboxylic acids having less than 10 carbon atoms in any carbon chain, no cyclic groups, and olefinic unsaturation. The preferred acids are dicarboxylic acids. Suitable acyclic, olefinic dicarboxylic acids are maleic acid, fumaric acid, aconitic acid, itaconic acid and alkyl-substituted maleic acids having less than ten carbon atoms in any uninterrupted carbon chain. A suitable acyclic, olefinic monocarboxylic acid is acrylic acid. Specific derivatives are citraconic anhydride and maleic acid partially esterified with an aliphatic alcohol. Citric acid when subjected to the conditions under which citraconic anhydride or itaconic acid is produced (Bernthsen, Textbook of Organic Chemistry (1923) pages 250 to 256) can also be employed.

Minor amounts of synthetic and naturally occurring dienes such as cyclopentadiene, butadiene, cashew nut shell oil, gum rosin and myrcene, which react with the compound having an available acyclic, olefinic carboxylic acid residue by Diels Alder addition may be introduced to modify the reaction product of the oil and the carboxylic acid.

When such aqueous solutions are used as stoving primers and paints for metal, the final coating is often insufficiently hard and has insufficient resistance to corrosion under humid conditions.

It is an object of the present invention to provide surface coating compositions which give rise to coatings having improved hardness and improved resistance to corrosion under humid conditions. A further object is to provide compositions which give rise to coatings on metal which have high impact strength and good flexibility.

According to the present invention an improved water-dilutable surface coating composition comprises an aqueous solution of the reaction product of a compound functioning as an unsaturated oil with a compound having an available acyclic, olefinic carboxylic acid residue both compounds as herein defined, or an aqueous solution of the product obtained by reacting said reaction product with formaldehyde, said solutions containing a mixture of cobalt, lead and iron drying agents in amounts 0.01–0.1% cobalt, 0.05–5.0% lead and 0.005–0.1% iron, all percentages being by weight of the reaction product or the formaldehyde reacted reaction product.

Maleic acid is the preferred acyclic, olefinic carboxylic acid and it is preferred to employ it in the form of maleic anhydride.

The compound functioning as the unsaturated oil and sufficient of the compound having an available acyclic, olefinic carboxylic acid residue are reacted together until a water-soluble product is obtained. By water-soluble is meant that the product dissolves in water containing a base, for example a soluble alkali metal hydroxide or an ammonia base of the class which consists of ammonia and primary, secondary and tertiary aliphatic amines, or in such an aqueous solution of a base after the addition thereto of a water miscible solvent such as isopropanol or butyl Cellosolve.

The conditions for the reaction and the relative proportions of the reactants are known, e.g. from British patent specification 500,349, United States patent specification 2,414,712 and French patent specification 1,258,000. Suitably the reaction is effected by heating the reactants together for an extended period of time at a temperature of at least 110° C. and commonly below 300° C. until the water-soluble product is obtained. When maleic anhydride is employed to react with linseed oil, the preferred reaction temperature is between 200 and 240° C. and the reaction is carried out under reflux conditions in order to return to the mixture any maleic anhydride which boils or sublimes off. Such reactions suitably employ 15 to 25% maleic anhydride on the total weight of linseed oil and maleic anhydride.

When the oil/acid product is further reacted with formaldehyde, the latter can be introduced in various ways. For instance formalin (an aqueous solution of formaldehyde), paraformaldehyde (a low polymer of formaldehyde) or "flake" formaldehyde containing about 78% by weight of formaldehyde can be used. The form of the formaldehyde employed is preferably chosen so that it is soluble in the reaction mixture.

The proportion of formaldehyde present during the reaction with the oil/acid product can be varied widely. It is unnecessary to employ a weight of formaldehyde greater than about ⅓ of the weight of the oil/acid product because the excess formaldehyde appears in the surface coating composition as uncombined formaldehyde. Even small proportions of formaldehyde improve the surface coating characteristics of the oil/acid product. However, the preferred compositions are prepared by reacting the oil/acid product with from 1% to 10% by weight of formaldehyde.

The reaction of the formaldehyde and the oil/acid product can be carried out under substantially anhydrous conditions, but it is preferred to have water present in order to control the reaction and prevent gelation of the reaction mixture occurring. Most suitably the reaction mixture contains from 40% to 50% by weight of water.

It is observed that when the reaction of the oil/acid product and the formaldehyde is carried out in the presence of water, the viscosity of the reaction mixture falls as the reaction proceeds. This can be used as a guide to the progress of the reaction.

The reaction of the formaldehyde and the oil/acid product can be effected by heating the ingredients together. When water is present this can be conveniently achieved by heating the mixture under reflux conditions. The reaction of formaldehyde and the oil/acid product can be carried out under acid or alkaline conditions for instance in the range 3.5 to 9.0. The preferred pH value being in the range 4.5–8.5.

Any cobalt, lead or iron drying agent can be employed. Such agents are well known in connection with the drying of surface coating compositions. Suitable agents are the cobalt, lead and iron naphthenates. The relative and absolute amounts of the agents is critical. They are expressed throughout this specification in terms of the weight of metal present as a percentage of the weight of the solvent free surface coating preparation present. Although up to 5% by weight of lead can be used, it is preferred not to increase the quantity of this component above 0.5%.

The drying agents or mixture thereof may be added to the surface coating composition in the form of a solution or solutions in a solvent such as white spirit. Alternatively the agents may be added as aqueous dispersions.

Preferably the concentration of the diluted surface coating composition according to the present invention when used to coat a surface, is in the range from 15 to 60 grams of resinous material per 100 millilitres of liquid, although solutions having a concentration outside this range are sometimes useful for special purposes; for example, solutions of higher concentration may be usefully employed after addition of a water-miscible organic solvent to reduce viscosity to a practical level. The compositions can be applied to substrates of many types in order to form hard, resistant surface coatings thereon, but are particularly useful for coating metal surfaces.

The film formed on the substrate as the water (and any other solvent) evaporates is relatively soft and can be brought into its final hard state by the action of heat. The conditions under which such curing is brought about are not critical, and long curing times at relatively low temperatures or short curing times at relatively high temperatures can be employed. For example the curing is often most suitably carried out by heating the film for instance in an oven or by infra-red radiation to a temperature between 110° and 200° C. for periods ranging from 15 minutes to 60 minutes. Alternatively a very brief heating period, e.g. from 1 to 5 minutes at higher temperatures, e.g. 220 to 250° C. is sometimes advantageous.

The cured films formed from the surface coating compositions of the present invention are generally clear and hard. It is usual for these compositions to be used in conjunction with pigment in the form of paints. Metal panels coated with these cured paints show high resistance to corrosion under humid conditions.

The following examples illustrate the production of compositions according to the present invention and their conversion into hard, resistant surface coatings, the parts referred to are by weight.

EXAMPLE 1

*Water-solubilised linseed oil/maleic anhydride reaction product*

85 parts linseed oil and 15 parts of maleic anhydride are placed in a round bottomed reaction vessel fitted with a reflux condenser, thermometer and mechanical stirrer. The mixture is heated at 220° C. for from 5 to 8 hours under an atmosphere of nitrogen and then cooled.

100 parts of the maleinised oil are then mixed with 30 parts of water and refluxed for 15 minutes. A further 65 parts of water and aqueous ammonia are added until the pH value of the solution is between 7.2 and 7.6. To this solution is then added a mixture of cobalt, lead and iron naphthenates, containing, as percentages of the maleinised oil, 0.05% cobalt, 0.25% lead and 0.05% iron.

Films were laid onto glass and stoved at 150° C. for 30 minutes and then tested for hardness immediately on being removed from the oven and again after 15 minutes and 16 hours. The hardness test consists in trying to mark the film with a range of lead pencils applied with a force of 100 grams weight and recording the softest pencil which just marks the film. By way of comparison similar films were formed and tested, film A containing no drying agent, film B containing 0.05% cobalt and film C containing 0.05% cobalt and 0.25% lead and film D containing 0.05% cobalt, 0.25% lead and 0.05% manganese. The results obtained are shown in the following table:

PENCIL HARDNESS

| Film | Immediately after leaving oven | After 15 mins. | After 16 hrs. |
| --- | --- | --- | --- |
| A | Tacky | Tacky | Tacky. |
| B | Less than 6B | HB | H. |
| C | ___do___ | B | F. |
| D | 3B | HB | 5H. |
| Example 1 | B | H | 7H. |

EXAMPLE 2

A water soluble resin is prepared as follows:

76 parts of linseed oil and 24 parts of maleic anhydride are placed in a round bottomed reactio nvessel fitted with a reflux condenser, thermometer and mechanical stirrer. The mixture is heated at 220° C., for from 5 to 8 hours under an atmosphere of nitrogen and then cooled.

150 parts of this maleinised oil are then mixed with 100 parts of water and 39.6 parts of 36% formalin. The mixture is held under reflux conditions for several hours and finally the pH value is adjusted from about 4.5 to between 7.2 and 7.6 by addition of ammonia. To portions of this resin, iron, lead and cobalt driers were added in various combinations, such that the percentages of metal, based on the weight of solvent free resin were as follows:

Iron 0.05%, lead 0.25% and cobalt 0.06%. Films were prepared on glass having a thickness of 0.003 inch and were stoved for 30 minutes at 150° C. The Pencil Hardness was determined as outlined in Gardner, Phys. and Chem. Examination of Paints, Varnishes, Lacquers and Colours, Gardner and Sward, 12th edition, 1962, p. 138.

Results are as follows:

| Drying Agents | On removal from oven | After 15 minutes | After 1 hour | After 2 hours | After 60 hours |
| --- | --- | --- | --- | --- | --- |
| Co, Pb, Fe | H | 2H | 2H | 2H | 2H. |
| Co, Fe | F | H | H | 2H | 2H. |
| Co, Pb | 4B | 4B | 3B | 3B | 3B. |
| Co | 3B | 2B | 2B | 2B | 2B. |
| Fe | B | H | H | H | H. |
| Pb | 5B | 5B | 5B | 5B | 4B. |

Co=cobalt; Pb=lead; and Fe=iron.

We claim:

1. A composition which comprises an aqueous solution of a surface coating preparation selected from the group consisting of (1) the reaction product of a compound functioning as an unsaturated oil with a compound having an available acyclic, olefinic carboxylic acid residue, the acid being a carboxylic acid having less than 10 carbon atoms in any carbon chain and being free of cyclic groups and (2) the product obtained by reacting said reaction product (1) with formaldehyde, said solution containing a mixture of cobalt, lead and iron drying agents in amounts 0.01–0.1% cobalt, 0.05–5.0% lead and 0.005–0.1% iron, all percentages being by weight of the surface coating preparation.

2. A composition as claimed in claim 1 wherein the amount of lead drying agent present lies in the range 0.05 to 0.5% lead.

References Cited by the Examiner

UNITED STATES PATENTS

| | | | |
|---|---|---|---|
| 2,414,712 | 1/1947 | Bolley | 106—250 |
| 2,565,897 | 8/1951 | Wheeler | 106—264 |

OTHER REFERENCES

Rose: The Condensed Chemical Dictionary, Reinhold Pub. Corp.

ALEXANDER H. BRODMERKEL, *Primary Examiner.*

MORRIS LIEBMAN, *Examiner.*

D. C. KOLASCH, J. B. EVANS, *Assistant Examiners.*